US008289298B2

(12) United States Patent
Choi et al.

(10) Patent No.: US 8,289,298 B2
(45) Date of Patent: Oct. 16, 2012

(54) LIGHT SENSING CIRCUIT, METHOD OF DRIVING THE SAME, AND TOUCH PANEL INCLUDING THE LIGHT SENSING CIRCUIT

(75) Inventors: Deok-Young Choi, Yongin (KR); Yong-Sung Park, Yongin (KR); Do-Youb Kim, Yongin (KR); Soon-Sung Ahn, Yongin (KR); In-Ho Choi, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 446 days.

(21) Appl. No.: 12/568,931

(22) Filed: Sep. 29, 2009

(65) Prior Publication Data

US 2010/0097334 A1 Apr. 22, 2010

(30) Foreign Application Priority Data

Oct. 17, 2008 (KR) .................. 10-2008-0102109

(51) Int. Cl.
*G06F 3/042* (2006.01)
(52) U.S. Cl. .................................... 345/175
(58) Field of Classification Search .................. None
See application file for complete search history.

(56) References Cited

U.S. PATENT DOCUMENTS

| 2009/0015166 | A1* | 1/2009 | Kwon ..................... 250/214 B |
| 2009/0033850 | A1* | 2/2009 | Ishiguro et al. ............ 349/116 |

FOREIGN PATENT DOCUMENTS

| JP | 10-233741 | 9/1998 |
| JP | 2006-202984 | 8/2006 |

OTHER PUBLICATIONS

Korean Office Action dated Jul. 5, 2010, issued in corresponding Korean Patent Application No. 10-2008-0102109.

* cited by examiner

*Primary Examiner* — Wayne Young
*Assistant Examiner* — Brian Butcher
(74) *Attorney, Agent, or Firm* — Christie, Parker & Hale, LLP

(57) ABSTRACT

A light sensing circuit, a method of driving the same, and a touch panel including the light sensing circuit, the light sensing circuit including a photodiode generating current according to the brightness of light incident from the outside; a driving transistor having a first electrode to which a first power voltage is applied, a second electrode, and a gate electrode electrically connected to a cathode of the photodiode; a first reset transistor having a first electrode to which an initialization voltage is applied, a second electrode connected to the gate electrode of the driving transistor, and a gate electrode to which a previous scan signal is applied; and a shielding capacitor disposed between the gate electrode of the driving transistor and the cathode of the photodiode. Accordingly, the brightness of light incident on the photodiode can be accurately determined by initializing the cathode of the photodiode by using a constant voltage.

20 Claims, 3 Drawing Sheets

LIGHT SENSING CIRCUIT, METHOD OF DRIVING THE SAME, AND TOUCH PANEL INCLUDING THE LIGHT SENSING CIRCUIT

CROSS-REFERENCE TO RELATED APPLICATION

This application claims the benefit of Korean Patent Application No. 2008-102109, filed on Oct. 17, 2008, in the Korean Intellectual Property Office, the disclosure of which is incorporated herein in its entirety by reference.

BACKGROUND OF THE INVENTION

1. Field of the Invention

An aspect of the present invention relates to a light sensing circuit, a method of driving the same, and a touch panel including the light sensing circuit, and more particularly, to a light sensing circuit that can determine the brightness of incident external light by sensing current flowing in a photodiode, a method of driving the light sensing circuit, and a touch panel including the light sensing circuit.

2. Description of the Related Art

In general, input devices, such as a mouse or a keyboard, are used to apply an input signal to a computer. Remote controls, which are also input devices, are used to control a device, such as a digital television, in a way that a user can select a specific function. However, users who are not familiar with a mouse, keyboard, and a remote controller have difficulty using these input devices.

Touch panels or touch screens are novel input devices that have been suggested as an attempt to solve the above problem. A touch panel refers to an input device that allows a user to input a command signal by directly touching a display panel using his/her finger or a pen instead of a mouse.

Since command signals can be input by touching a display panel using a finger or the like, users having difficulty utilizing input devices, such as a mouse and a keyboard, can easily use digital devices, such as a computer, using such touch panels or touchscreens. There are a number of types of touch panel technology according to a method of recognizing an external input. Such technologies include capacitive technology, resistive overlay technology, infrared beam technology, surface acoustic wave technology using ultrasonic waves, integral strain gauge technology, piezo electric technology, and light sensing technology. Light sensing technology involves forming a photodiode in a display panel and sensing current generated due to light incident on the photodiode in order to recognize a touch by a finger. The operation of a conventional light sensing circuit will now be explained.

FIG. 1 is a circuit diagram of a conventional light sensing circuit.

Referring to FIG. 1, the conventional light sensing circuit includes a photodiode D, a first reset transistor Tr1, a driving transistor Tr2, a first transistor Tr3, a second transistor Tr4, and a first capacitor C1.

A cathode of the photodiode D is connected to a first node N1. The first node N1 is connected to the driving transistor Tr2, the first capacitor C1, the first reset transistor Tr1, and the first transistor Tr3.

An initialization voltage $V_{init}$ is applied to the first node N1 through the first reset transistor Tr1. However, although the initialization voltage $V_{init}$ is cyclically applied, since the first node N1 is connected to various elements as described above, the risk that leakage current occurs is high. The potential of the first node N1 does not remain constant due to the leakage current and a deviation occurs in each cycle.

Since the same brightness current can be generated at the same brightness only when voltages applied to the cathode and an anode of the photodiode D are constant, such a deviation makes it difficult to accurately sense brightness.

FIG. 2 is a graph illustrating a deviation in brightness data due to brightness current output from the conventional light sensing circuit of FIG. 1.

Referring to FIG. 2, an output voltage is not constant and a deviation $\Delta V$ occurs.

Accordingly, a method is needed for accurately sensing incident light by enabling voltages applied to both the cathode and the anode of the photodiode D to be constant.

Also, sometimes the voltage of the cathode of the photodiode D becomes lower than the voltage of the anode of the photodiode D during initialization, thereby the photodiode D of the conventional light sensing circuit of FIG. 1 is not properly forward biased. Accordingly, there is also a need for a method of preventing such a forward bias problem.

SUMMARY OF THE INVENTION

An aspect of the present invention provides a light sensing circuit that can accurately determine the brightness of light incident on a photodiode by initializing a cathode of the photodiode using a constant voltage, a method of driving the light sensing circuit, and a touch panel including the light sensing circuit.

According to an aspect of the present invention, there is provided a light sensing circuit including: a photodiode generating current according to the brightness of incident external light; a driving transistor including a first electrode to which a first power voltage is applied, a second electrode, and a gate electrode electrically connected to a cathode of the photodiode; a first reset transistor including a first electrode to which an initialization voltage is applied, a second electrode connected to the gate electrode of the driving transistor, and a gate electrode to which a previous scan signal is applied; and a shielding capacitor disposed between the gate electrode of the driving transistor and the cathode of the photodiode.

The light sensing circuit may further include a second reset transistor including a first electrode to which a second power voltage is applied, a second electrode connected to the cathode of the photodiode, and a gate electrode to which a scan signal is applied. The first power voltage and the second power voltage may be the same.

The light sensing circuit may further include: a first capacitor disposed between the first electrode of the driving transistor and the gate electrode of the driving transistor; and a first transistor including a first electrode connected to the gate electrode of the driving transistor, a second electrode connected to the second electrode of the driving transistor, and a gate electrode to which the scan signal is applied.

The light sensing circuit may further include a second transistor comprising a first electrode connected to the second electrode of the driving transistor, a second electrode connected to a data output line, and a gate electrode to which a sensor scan signal is applied.

According to another aspect of the present invention, there is provided a method of driving a light sensing circuit that amplifies current, which is generated according to the brightness of light incident on a photodiode, by using a driving transistor, the method including: applying a first initialization voltage to a gate electrode of the driving transistor; applying a second initialization voltage to a cathode of the photodiode; and generating current according to the brightness of incident light.

According to another aspect of the present invention, the method may further include amplifying the generated current.

According to another aspect of the present invention, the method may further include outputting the amplified current.

According to another aspect of the present invention, the second initialization voltage may be the same as a voltage applied to one electrode of the driving transistor.

According to another aspect of the present invention, there is provided a touch panel including: a plurality of light sensing circuits; a plurality of scan lines transmitting a scan signal to the plurality of light sensing circuits; a plurality of sensor scan lines transmitting an output signal to the plurality of light sensing circuits; and a plurality of data output lines outputting brightness current from the plurality of light sensing circuits, wherein each of the plurality of light sensing circuits includes: a photodiode generating current according to the brightness of incident external light; a driving transistor including a first electrode to which a first power voltage is applied, a second electrode, and a gate electrode electrically connected to a cathode of the photodiode; a first reset transistor including a first electrode to which an initialization voltage is applied, a second electrode connected to the gate electrode of the driving transistor, and a gate electrode to which a previous scan signal is applied; a shielding capacitor disposed between the gate electrode of the driving transistor and the cathode of the photodiode; and a second transistor including a first electrode connected to the second electrode of the driving transistor, a second electrode connected to a data output line, and a gate electrode to which the output signal is applied.

According to another aspect of the present invention, the light sensing circuit may further include a second reset transistor having a first electrode to which a second power voltage is applied, a second electrode connected to the cathode of the photodiode, and a gate electrode to which the scan signal is applied. The first power voltage and the second power voltage may be the same.

According to another aspect of the present invention, the light sensing circuit may further include: a first capacitor disposed between the first electrode of the driving transistor and the gate electrode of the driving transistor; and a first transistor having a first electrode connected to the gate electrode of the driving transistor, a second electrode connected to the second electrode of the driving transistor, and a gate electrode to which the scan signal is applied.

According to another aspect of the present invention, the touch panel may further comprise a scan driving unit connected to the plurality of scan lines and supplying the scan signal. The touch panel may further include a sensor scan driving unit connected to the plurality of sensor scan lines and supplying the sensor scan signal.

According to another aspect of the present invention, the touch panel may further include a sensing output unit connected to the plurality of data output lines, receiving the brightness current, and outputting brightness data of light incident on the plurality of light sensing circuits. The touch panel may further include a controller determining the location of a touch by using the brightness data.

According to another aspect of the present invention, the touch panel may further include: a plurality of display circuits; a plurality of data lines transmitting a data signal to the plurality of display circuits; and a data driving unit connected to the plurality of data lines and providing the data signal. Each of the plurality of display circuits may be a pixel circuit of an organic light emitting display device.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
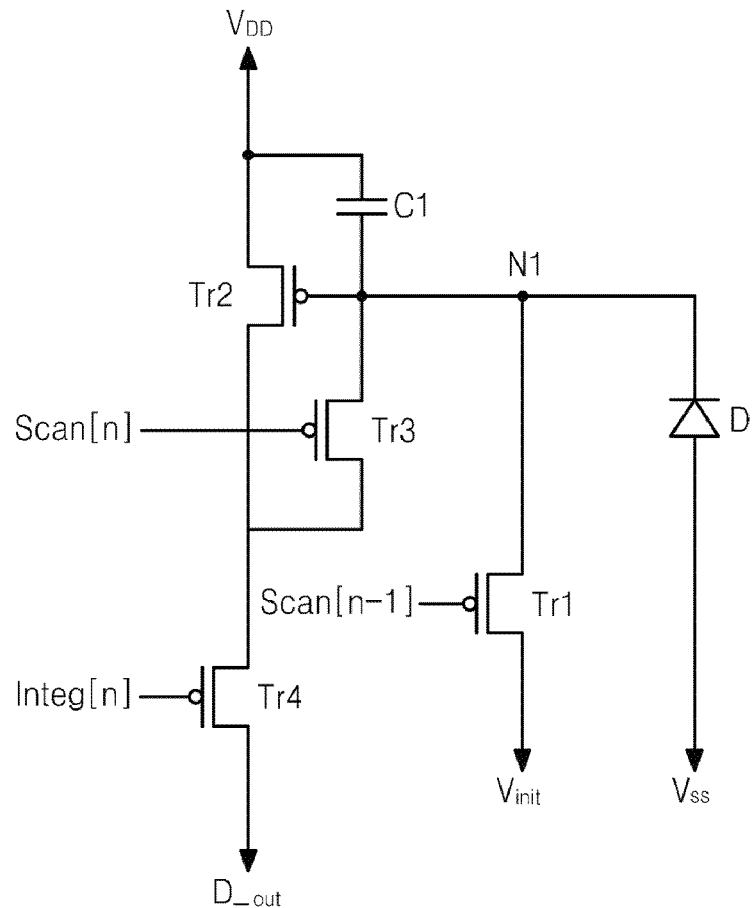
FIG. 1 is a circuit diagram of a conventional light sensing circuit.
Figure 2:
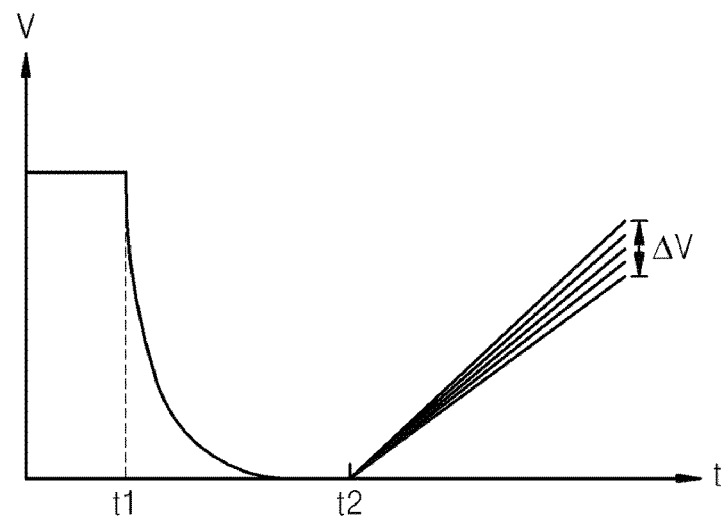
FIG. 2 is a graph illustrating a deviation in brightness data due to brightness current output from the conventional light sensing circuit of FIG. 1.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 3:
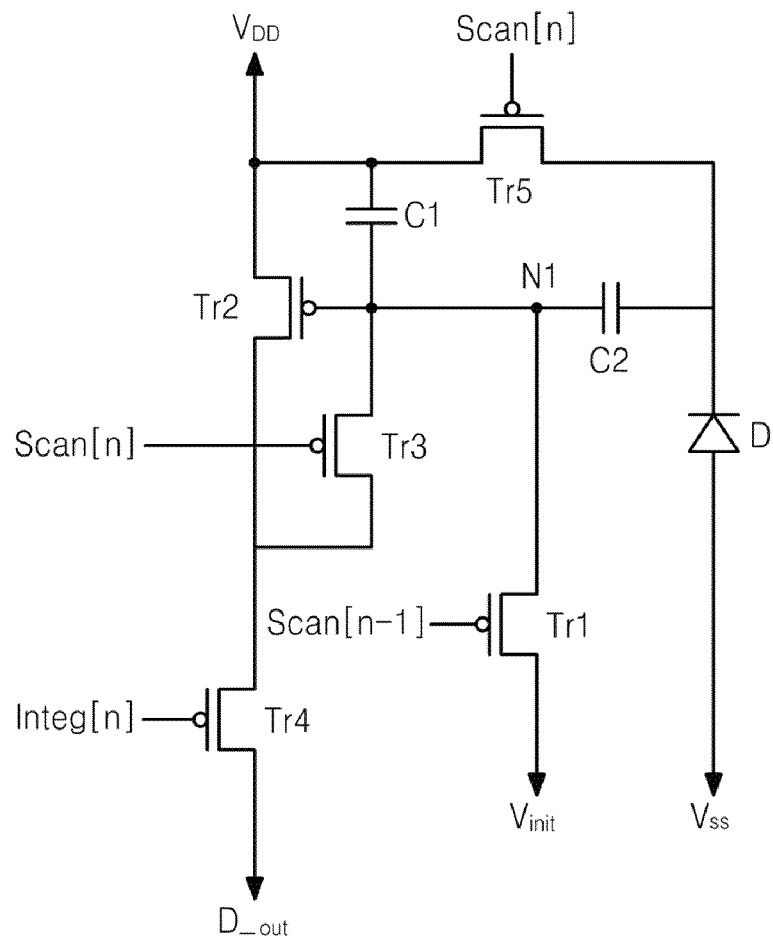
FIG. 3 is a circuit diagram of a light sensing circuit according to an embodiment of the present invention.
Figure 4:
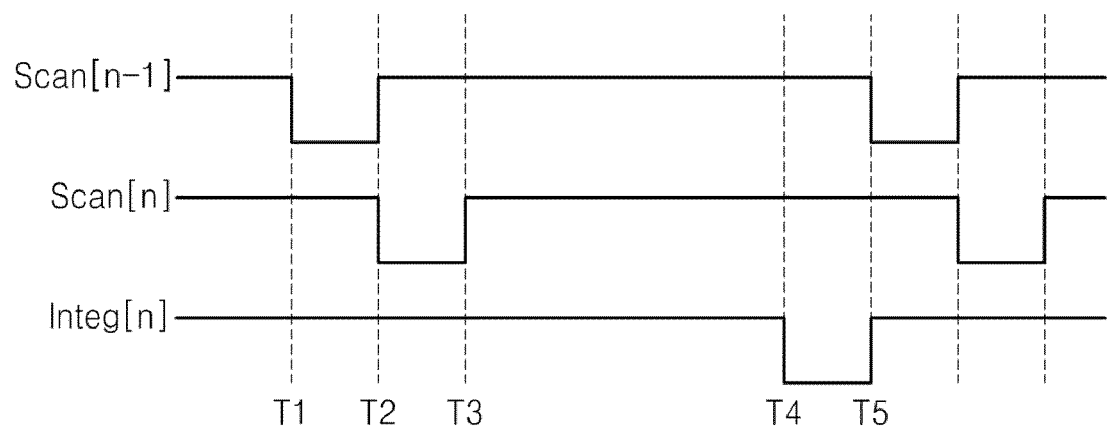
FIG. 4 is a timing diagram for explaining a method of driving the light sensing circuit of FIG. 3, according to an embodiment of the present invention.

FIG. 3 is a circuit diagram of a light sensing circuit according to an embodiment of the present invention. FIG. 4 is a timing diagram for explaining a method of driving the light sensing circuit of FIG. 3, according to an embodiment of the present invention.

Referring to FIG. 3, the light sensing circuit may include a photodiode D, a first reset transistor Tr1, a driving transistor Tr2, and a shielding capacitor C2.

The photodiode D generates current according to the brightness of incident external light on the device, such as a touch panel. The photodiode D includes an anode and a cathode. A ground voltage $V_{SS}$ is applied to the anode of the photodiode D. The cathode of the photodiode D is connected to a second electrode of the shielding capacitor C2. The photodiode D is reverse biased unlike a general diode. Accordingly, the potential of the anode is lower than the potential of the cathode. If external light is incident while the photodiode D is reverse biased, current is generated according to the brightness of the light.

The first reset transistor Tr1 applies an initialization voltage $V_{init}$ to a first node N1. The first reset transistor Tr1 includes a first electrode to which an initialization voltage $V_{init}$ is applied, a second electrode connected to the first node N1, and a gate electrode to which a previous scan signal is applied. A previous scan signal refers to a scan signal preceding a scan signal in time among scan signals that are sequentially applied to the light sensing circuit. For example, if a plurality of light sensing circuits are arranged in an nHm matrix and an arbitrary light sensing circuit is located in an Nth row, a signal applied to a previous scan line Scan[n−1] is a previous scan signal. If the previous scan signal is a logic low signal, the first reset transistor Tr1 is turned on and thus the initialization voltage $V_{init}$ is applied to the first node N1.

That is, the first reset transistor Tr1 enables the light sensing circuit to set back to its initial state before a light-integrating operation is performed.

The driving transistor Tr2 outputs brightness current corresponding to the brightness of light incident on the photodiode D. The driving transistor Tr2 includes a first electrode, a second electrode, and a gate electrode. A first power voltage $V_{DD}$ is applied to the first electrode of the driving transistor Tr2, the gate electrode of the driving transistor Tr2 is connected to the first node N1, and the second electrode of the driving transistor Tr2 is electrically connected to a data output line $D\_{out}$.

The shielding capacitor C2 includes a first terminal connected to the gate electrode of the driving transistor Tr2 and a second terminal connected to the cathode of the photodiode D. The first node N1 and the cathode of the photodiode D are separated from each other by the shielding capacitor C2, such that even though a fine change in the potential of the first node N1 occurs, the effect of the change on the cathode of the photodiode D can be reduced.

The light sensing circuit may further include a second reset transistor Tr5 in order to initialize the cathode of the photodiode D.

The second reset transistor Tr5 includes a first electrode, a second electrode, and a gate electrode. A second power voltage is applied to the first electrode of the second reset transistor Tr5, the second electrode of the second reset transistor Tr5 may be connected to the cathode of the photodiode D, and a scan signal may be applied from a scan line Scan[n] to the gate electrode of the second reset transistor Tr5. The scan signal is a scan signal subsequent to the previous scan signal that is applied to the first reset transistor Tr1. Accordingly, the first node N is first initialized due to the previous scan signal, and then, the cathode of the photodiode D is initialized due to the scan signal. Since the cathode of the photodiode D and the first node N1 are initialized separately, the initialization operation of the photodiode D can be performed more stably.

The second power voltage applied to the first electrode of the second reset transistor Tr5 may be the same as the first power voltage $V_{DD}$ applied to the first electrode of the driving transistor Tr2. In this case, since a common power source can be used, the light sensing circuit can be formed more simply.

The light sensing circuit may further include a first capacitor C1 including a first terminal connected to the first electrode of the driving transistor Tr2 and a second terminal connected to the gate electrode of the driving transistor Tr2. The light sensing circuit may also include a first transistor Tr3 including a first electrode connected to the gate electrode of the driving transistor Tr2, a second electrode connected to the second electrode of the driving transistor Tr2, and a gate electrode to which the scan signal is applied.

The light sensing circuit including the first capacitor C1 and the first transistor Tr3 can compensate for a threshold voltage deviation of the driving transistor Tr2. A process of compensating for the threshold voltage deviation will be explained when explaining the entire operation of the light sensing circuit.

The light sensing circuit may further include a second transistor Tr4 including a first electrode connected to the second electrode of the driving transistor Tr2, a second electrode connected to the data output line $D\_{out}$, and a gate electrode to which a sensor scan signal is applied.

If the second transistor Tr4 is turned on due to the sensor scan signal transmitted from a sensor scan line Integ[n], a considerable amount of brightness current corresponding to a voltage difference between the gate electrode of the driving transistor Tr2 and the first electrode of the driving transistor Tr2 is output to the data output line $D\_{out}$.

FIG. 4 is a timing diagram for explaining a method of driving the light sensing circuit of FIG. 3, according to an embodiment of the present invention.

If a scan signal applied to the previous scan line Scan[n−1] is changed to a logic low signal, the first reset transistor Tr1 is turned on and thus an initialization voltage $V_{init}$ is applied to the first node N1 during an initialization operation. Due to the initialization operation, a voltage applied to the gate electrode of the driving transistor Tr2 in a previous cycle is changed to the initialization voltage $V_{init}$.

After the initialization operation of the first node N1, a scan signal applied to the scan line Scan[n] is changed to a logic low signal. Due to the change of the scan signal, the cathode of the photodiode D is initialized. The voltage of the cathode of the photodiode D may be the same as the first power voltage $V_{DD}$ applied to the first electrode of the driving transistor Tr2. However, the present invention is not limited thereto. Accordingly, since the first node N1 and the cathode of the photodiode D are initialized separately, the initialization operation can be performed stably.

Meanwhile, if the scan signal is changed to a logic low signal, the first transistor Tr3 is turned on. As a result, the gate electrode and the second electrode of the driving transistor Tr2 are connected to each other and a diode connection is formed. Since the first power voltage $V_{DD}$ is applied to the first electrode of the driving transistor Tr2, a voltage corresponding to a voltage ($V_{DD}$−Vth) that is obtained by subtracting a threshold voltage Vth from the first power voltage $V_{DD}$ is applied to the gate electrode of the driving transistor Tr2, and a voltage corresponding to the threshold voltage Vth is applied to both ends of the first capacitor C1.

After the scan signal is changed again to a logic high signal, the light sensing circuit performs a light-integrating operation. The light-integrating operation refers to an operation of integrating light incident on the photodiode D of the light sensing circuit and measuring the brightness of the light. In order to measure the brightness of the light, a change in the potential of the cathode of the photodiode D due to current generated by the photodiode D may be measured.

If the potential of the cathode of the photodiode D is lowered during the light-integrating operation, the potential of the first node N1 is also lowered due to the coupling of the shielding capacitor C2. If a voltage difference due to the drop in the potential of the cathode is ΔV, a voltage difference due to the drop in the potential of the first node N1 is also ΔV. Accordingly, a voltage applied to the gate electrode of the driving transistor Tr2 and the first node N1 is $V_{DD}$−Vth−ΔV, and a voltage difference between the gate electrode and the first electrode of the driving transistor Tr2 is |$V_{DD}$−Vth−ΔV−$V_{DD}$|=Vth+ΔV.

When the light-integrating operation ends, a sensor scan signal is applied to the sensor scan line Integ[n]. The second transistor Tr4 is turned on due to the sensor scan signal, and brightness current, which corresponds to the voltage difference between the gate electrode and the first electrode of the driving transistor Tr2, begins to flow. The brightness current may be applied to an external device through the data output line $D\_{out}$. The magnitude of the brightness current is defined by:

$$I = \frac{\beta}{2}(|V_{GS}| - Vth)^2 = \frac{\beta}{2}(|V_{DD} - Vth - \Delta V - V_{DD}| - Vth)^2 = \frac{\beta}{2}\Delta V^2 \quad (1)$$

where Vth is the threshold voltage of the driving transistor Tr2 and β is a constant. Since the brightness current is irrelevant to the threshold voltage Vth of the driving transistor Tr2 in Equation 1, a threshold voltage deviation occurring in the driving transistor Tr2 can be compensated for.

Accordingly, since two initialization operations are performed using the shielding capacitor C2, the initialization operations can be performed stably. Also, the forward bias problem of the photodiode D which may be caused during the initialization operation can be prevented. Also, since the first capacitor C1 and the first transistor Tr3 are employed, an error due to the threshold voltage deviation in the brightness current can be compensated for.

Although each transistor is a PMOS transistor in FIG. 3, an aspect of the present invention is not limited thereto and some or all of the transistors may be NMOS transistors. If one of the PMOS transistors in FIG. 3 is changed to an NMOS transistor, a signal applied to the transistor is also changed to a logic low (or high) signal that is opposite to that applied when the PMOS transistor is still used. The magnitudes of the first power voltage $V_{DD}$, the initialization voltage $V_{init}$, and the ground voltage $V_{SS}$ may be changed as well, and the changed magnitudes would have been easily obtained by one of ordinary skill in the art.

Figure 5:
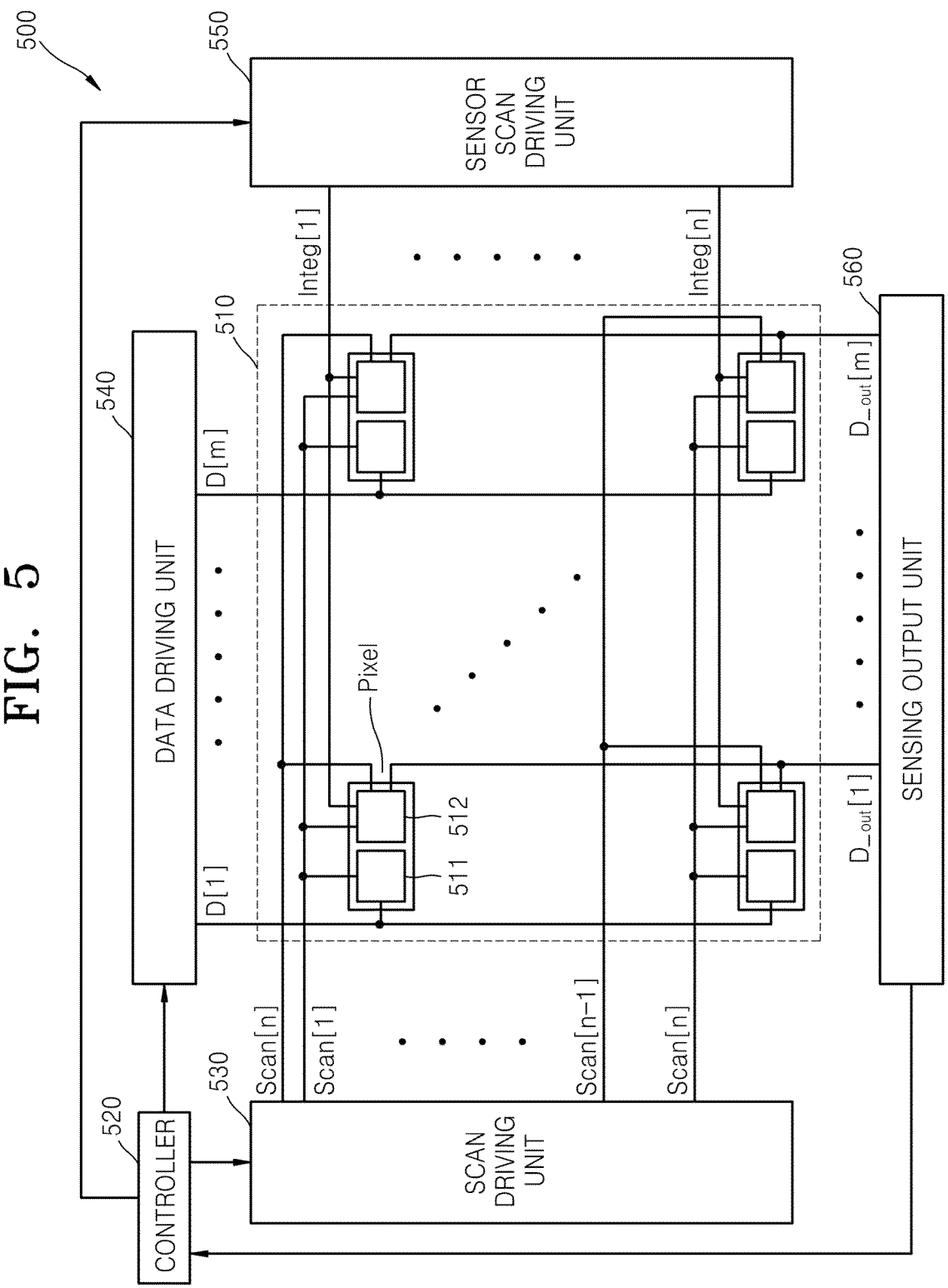
FIG. 5 illustrates a touch panel according to an embodiment of the present invention.

FIG. 5 illustrates a touch panel 500 according to an embodiment of the present invention.

Referring to FIG. 5, the touch panel 500 may include a display unit 510, a controller 520, a scan driving unit 530, a data driving unit 540, a sensor scan driving unit 550, and a sensing output unit 560. The display unit 510 of the touch panel 500 may include a plurality of pixels arranged in an nHm matrix. The touch panel 500 may further include n scan lines Scan[1] through S[n] and n sensor scan lines Integ[1] through Integ[n] which are arranged in rows, and m data lines D[1] through D[m] and m data output lines $D_{\_out}[1]$ through $D_{out}[m]$ which are arranged in columns.

Each of the plurality of pixels may include a display circuit 511 and a light sensing circuit 512.

The display circuit 511 may be a display circuit of an organic light emitting display (OLED) device. The display circuit 511 may be a pixel circuit including two transistors, one capacitor, and an OLED. The display circuit 511 may display data in the same manner as that of a display circuit of a conventional OLED device and thus a detailed explanation of the operation of the display circuit 511 will not be given. The present invention is not limited to the display circuit 511 of FIG. 5, and any of various types of conventional display circuits may be used.

The light sensing circuit 512 of FIG. 5 may be the light sensing circuit of FIG. 3.

A scan signal used to select the display circuit 511 may be the same as a scan signal applied to the light sensing circuit 512, and accordingly, the scan lines Scan[1] through S[n] may be shared by the display circuit 511 and the light sensing circuit 512. The light sensing circuit of FIG. 3 requires a previous scan signal. Accordingly, as shown in FIG. 5, wires may extend so that light sensing circuits of any row may receive a scan signal from a scan line of another row that is formed over the former. In order to apply a previous scan signal to light sensing circuits of a first row, a last scan line Scan[n] may be further formed over a first scan line Scan[1]. Alternatively, the scan line Scan[n], which is the uppermost, may be virtual and thus be the same as a scan line Scan[n] that is the lowermost.

The display unit 510 may include the plurality of pixels arranged in an nHm matrix. Since each of the pixels includes the display circuit 511 and the light sensing circuit 512 as described above, the display unit 510 can simultaneously perform a display operation and a light sensing operation.

The controller 520 controls the operation of each of the scan driving unit 530, the data driving unit 540, the sensor scan driving unit 550, and the sensing output unit 560. Also, the controller 520 may receive brightness data applied from the sensing output unit 560 and determine the location of a touch. For example, the controller 520 may determine a spot where brightness is particularly lower or higher as the location of the touch from among all items of the brightness data. Since the controller 520 determines the location of the touch, the touch panel 500 can be used as an input device.

The scan driving unit 530 applies a scan signal to the scan lines Scan[1] through S[n]. The scan signal is sequentially applied to the scan lines Scan[1] through S[n], and a data signal is applied to the display circuit 511 in synchronization with the scan signal. Also, since the display circuit and the light sensing circuit share the scan lines Scan[1] through S[n], each of light sensing circuits 512 of a row to which the scan signal is applied can allow the photodiode D to be initialized and the gate electrode and the second electrode of the driving transistor Tr2 to be connected to each other to form a diode.

The data driving unit 540 applies a data signal to the data lines D[1] through D[m]. The data signal may be output from a voltage source or a current source in the data driving unit 540. The display circuit 511 may display data due to the data signal.

The sensor scan driving unit 550 applies a sensor scan signal to the sensor scan lines Integ[1] through Integ[n]. The sensor scan signal is sequentially applied to the sensor scan lines Integ[1] through Integ[n] after the scan signal is applied, and the second transistor Tr4 is turned on in synchronization with the sensor scan signal. When the second transistor Tr4 is turned on due to the sensor scan signal, brightness current generated by the driving transistor Tr2 is provided to the sensing output unit 560.

The sensing output unit 560 receives the brightness current through the data output lines $D_{\_out}[1]$ through $D_{\_out}[m]$ from the light sensing circuits 512 of the row that is selected by the scan signal. The applied brightness current is converted into brightness data by the sensing output unit 560. For example, current may be applied to a capacitor, voltages of both ends of the capacitor may be detected, and the detected voltages may be converted into brightness data. Alternatively, the brightness current may be detected and converted into brightness data. The present invention is not limited to the method of obtaining brightness data described above, and thus various modifications may be made. The brightness data may be provided to the controller 520, and the controller 520 may determine whether the panel has been touched with a finger or another object.

Accordingly, since the display circuit and the light sensing circuit can be simultaneously formed in the same process, the touch panel can be simply manufactured. Since an additional panel is not necessary, the thickness of the touch panel can be reduced.

Also, since the display circuit and the light sensing circuit can share scan lines, the number of driving devices for generating a driving signal and the number of wires necessary to drive the touch panel can be reduced.

While the present invention has been particularly shown and described with reference to exemplary embodiments thereof, it will be understood by those of ordinary skill in the art that various changes in form and detail may be made therein without departing from the spirit and scope of the present invention as defined by the following claims. The preferred embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A light sensing circuit comprising:
    a photodiode generating current according to brightness of incident external light;
    a driving transistor comprising a first electrode to which a first power voltage is applied, a second electrode, and a gate electrode electrically connected to a cathode of the photodiode;
    a first reset transistor comprising a first electrode to which an initialization voltage is applied, a second electrode connected to the gate electrode of the driving transistor, and a gate electrode to which a previous scan signal is applied; and
    a shielding capacitor having a first end coupled to the cathode of the photodiode, and a second end coupled to the second electrode of the first reset transistor and configured to receive the initialization voltage through the first reset transistor.

2. The light sensing circuit of claim 1, further comprising a second reset transistor comprising a first electrode to which a second power voltage is applied, a second electrode connected to the cathode of the photodiode, and a gate electrode to which a scan signal is applied.

3. The light sensing circuit of claim 2, wherein the first power voltage and the second power voltage are the same.

4. The light sensing circuit of claim 2, further comprising:
    a first capacitor disposed between the first electrode and the gate electrode of the driving transistor; and
    a first transistor comprising a first electrode connected to the gate electrode of the driving transistor, a second electrode connected to the second electrode of the driving transistor, and a gate electrode to which the scan signal is applied.

5. The light sensing circuit of claim 1, further comprising a second transistor comprising a first electrode connected to the second electrode of the driving transistor, a second electrode connected to a data output line, and a gate electrode to which a sensor scan signal is applied.

6. A method of driving a light sensing circuit that amplifies current, which is generated according to a brightness of external light incident on a photodiode, by using a driving transistor, the method comprising steps of: determining the brightness of external incident light by:
    applying a first initialization voltage to a gate electrode of the driving transistor and to a first electrode of a capacitor;
    applying a second initialization voltage to a cathode of the photodiode and to a second electrode of the capacitor; and
    generating current according to the brightness of the external incident light.

7. The method of claim 6, wherein the generated current is converted into brightness data and is used to determine whether the light sensing circuit has been touched by an object.

8. The method of claim 6, wherein the second initialization voltage is the same as a voltage applied to one electrode of the driving transistor.

9. A touch panel comprising:
    a plurality of light sensing circuits;
    a plurality of scan lines transmitting a scan signal to the plurality of light sensing circuits;
    a plurality of sensor scan lines transmitting an output signal to the plurality of light sensing circuits; and
    a plurality of data output lines outputting brightness current from the plurality of light sensing circuits,
    wherein each of the plurality of light sensing circuits comprises:
        a photodiode generating current according to a brightness of external light incident on the touch panel;
        a driving transistor comprising a first electrode to which a first power voltage is applied, a second electrode, and a gate electrode electrically connected to a cathode of the photodiode;
        a first reset transistor comprising a first electrode to which an initialization voltage is applied, a second electrode connected to the gate electrode of the driving transistor, and a gate electrode to which a previous scan signal is applied;
        a shielding capacitor having a first end coupled to the cathode of the photodiode, and a second end coupled to the second electrode of the first reset transistor and configured to receive the initialization voltage through the first reset transistor; and
    a second transistor comprising a first electrode connected to the second electrode of the driving transistor, a second electrode connected to a data output line, and a gate electrode to which a sensor scan signal is applied.

10. The touch panel of claim 9, wherein the light sensing circuit further comprises a second reset transistor comprising a first electrode to which a second power voltage is applied, a second electrode connected to the cathode of the photodiode, and a gate electrode to which the scan signal is applied.

11. The touch panel of claim 10, wherein the first power voltage and the second power voltage are the same.

12. The touch panel of claim 9, wherein the light sensing circuit further comprises:
    a first capacitor disposed between the first electrode and the gate electrode of the driving transistor; and
    a first transistor comprising a first electrode connected to the gate electrode of the driving transistor, a second electrode connected to the second electrode of the driving transistor, and a gate electrode to which the scan signal is applied.

13. The touch panel of claim 9, further comprising a scan driving unit connected to the plurality of scan lines and supplying the scan signal.

14. The touch panel of claim 9, further comprising a sensor scan driving unit connected to the plurality of sensor scan lines and supplying the sensor scan signal.

15. The touch panel of claim 9, further comprising a sensing output unit connected to the plurality of data output lines, receiving the brightness current, and outputting brightness data of external light incident on the plurality of light sensing circuits.

16. The touch panel of claim 15, further comprising a controller determining a touch location on the touch panel by using the brightness data.

17. The touch panel of claim 9, further comprising:
    a plurality of display circuits;
    a plurality of data lines transmitting a data signal to the plurality of display circuits; and
    a data driving unit connected to the plurality of data lines and providing the data signal.

18. The touch panel of claim 17, wherein each of the plurality of display circuits is a pixel circuit of an organic light emitting display device.

19. The touch panel of claim 17, wherein the scan signal transmitted to the plurality light sensing circuits is also transmitted to the plurality of display circuits.

20. The touch panel of claim 17, wherein the light sensing circuits and the display circuits share the plurality of scan lines.

* * * * *